(12) United States Patent
Ruppert

(10) Patent No.: US 11,322,968 B2
(45) Date of Patent: May 3, 2022

(54) BIDIRECTIONAL DC WALLBOX FOR ELECTRIC VEHICLES

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/945,597

(22) Filed: Jul. 31, 2020

(65) Prior Publication Data

US 2021/0036536 A1 Feb. 4, 2021

(30) Foreign Application Priority Data

Aug. 1, 2019 (DE) .......................... 102019211553.5

(51) Int. Cl.
*H02J 7/02* (2016.01)
*H02J 7/00* (2006.01)
*B60L 53/14* (2019.01)

(52) U.S. Cl.
CPC .............. *H02J 7/02* (2013.01); *H02J 7/0013* (2013.01); *B60L 53/14* (2019.02)

(58) Field of Classification Search
CPC ............ H02J 7/02; H02J 7/0013; B60L 53/14
USPC ........................................................ 320/104
See application file for complete search history.

(56) References Cited

U.S. PATENT DOCUMENTS

| 8,242,627 B2* | 8/2012 | Ichikawa ................ B60L 8/003 |
| | | 307/10.1 |
| 9,263,968 B2* | 2/2016 | Potts et al. .......... H02M 7/4807 |
| 10,355,611 B2* | 7/2019 | Nagashima et al. ...... H02J 3/38 |
| 10,391,870 B2 | 8/2019 | Götz et al. |
| 2015/0375628 A1 | 12/2015 | Biagini et al. |
| 2016/0176305 A1 | 6/2016 | James et al. |
| 2017/0005584 A1 | 1/2017 | Guepratte et al. |

FOREIGN PATENT DOCUMENTS

| DE | 10 2011 079 430 A1 | 1/2013 |
| DE | 10 2016 123 924 A1 | 6/2018 |
| EP | 3 406 479 | 11/2018 |
| WO | 2005/008808 A2 | 1/2005 |

OTHER PUBLICATIONS

Manthey, N.; A brave new world of DC home charging; Oct. 17, 2018; (URL=https://www.electrive.com/2018/10/17/a-brave-new-world-of-dc-home-charging/); download date: Jul. 17, 2020.

* cited by examiner

*Primary Examiner* — Sun J Lin

(74) *Attorney, Agent, or Firm* — Seed IP Law Group LLP

(57) ABSTRACT

A bidirectional DC charging station is provided for wall mounting (DC wallbox) for a private sphere, to which a plurality of electric vehicles can be connected in parallel. A method for operating the DC wallbox is also provided.

10 Claims, 2 Drawing Sheets

BIDIRECTIONAL DC WALLBOX FOR ELECTRIC VEHICLES

BACKGROUND

Technical Field

The present disclosure relates to a bidirectional DC charging station for wall mounting (DC wallbox) for the private sphere, to which a plurality of electric vehicles can be connected in parallel, and also to a method for operating the DC wallbox.

Description of the Related Art

Present-day electric vehicles have a combination charging socket which enables direct-current charging (DC charging) at 480 V/150 kW and alternating-current charging (AC charging) at 230 V or 400 V and a maximum of 22 kW. Currently, 98% of customers charge their electric vehicle at the AC infrastructure in the private environment. In this case, the onboard charger of the electric vehicle converts the AC voltage into a direct voltage for charging the traction battery. The maximum charging power with three-phase polyphase current and 32A current is 22 kW. Private DC charging systems are currently not in very widespread use since they are very complex and expensive.

However, the situation will change significantly if bidirectional charging systems find their way into the private sector. Due to more flexible conversion possibilities and cost advantages, these bidirectional charging systems are designed as DC systems. The customer thus charges and discharges his car at a DC wallbox in the private environment as well.

If a customer owns several electric vehicles and wishes to connect them at the same time to his charging infrastructure or his home energy management system in order to charge them with, for example, photovoltaic electricity, he is forced to purchase a further DC wallbox and have it installed in his garage.

DE 10 2016 123 924 A1 discloses a power electronics unit for charging at least one electrically powered vehicle, the power electronics having at least two modules, each having at least one terminal pair with DC output, at least one rectifier, at least one AC input, at least one DC link and a number of switching elements. The switching elements are arranged on and/or between the DC outputs of the at least two modules in such a way that at least one serial and one parallel circuit configuration can be selectively adjusted dynamically between the at least two modules by suitable switching states of the switching elements.

DE 10 2011 079 430 A1 discloses a DC charging station for charging a plurality of energy storage devices. The charging station has a station-side busbar system (DC bus) for the modular expansion of the charging station by any number of DC charging interfaces. The infrastructure-side voltage is rectified and then further processed by downstream parallel-connected DC/DC converters. However, according to standard DIN EN 61851-23 (VDE 0122-2-3), parallel charging of several vehicles at the charging station is not permitted.

A charging system for simultaneously charging the batteries of a plurality of battery-operated vehicles is known from WO 2005 008 808 A2. Charging includes one or more DC/DC converters having one or more charging connections configured to be plugged into the batteries. The DC/DC power converters are each configured to be selectively connected to more than one charging connection in order to selectively provide higher connected load levels. The DC/DC converters are connected to an AC rectifier via a DC bus. The AC rectifier is connected to an AC source with a limited power rating. The AC charging system also has a controller which controls the operation of the DC/DC converters such that the total power consumption of the AC rectifier does not exceed the rated power. The system is further configured such that the DC/DC power converters can discharge selected batteries in order to provide power for charging other batteries, thereby enabling the switching of batteries.

BRIEF SUMMARY

Embodiments of the present disclosure provide a bidirectional DC charging station for wall mounting (DC wallbox) for electric vehicles, which is easy to expand and permits standard-compliant simultaneous charging of a plurality of electric vehicles.

One embodiment is a bidirectional DC wallbox with electrical isolation. The bidirectional DC wallbox includes an isolating element configured to reversibly connect and disconnect the DC wallbox to an AC voltage network and a rectifier (AC/DC converter) with a power factor correction filter (PFC) configured to rectify a three-phase AC voltage. The DC wallbox includes DC/DC converter (DC/DC converter) with electrical isolation. The DC/DC converter includes an inverter (DC/AC converter) and an alternating voltage bus system (AC bus) having a primary side and a secondary side electrically isolated therefrom. The DC/DC converter includes at least one active rectifier (AC/DC converter) configured to convert an AC voltage into a DC voltage of a predetermined voltage level and at least one charging output for connection to a charging socket of an electric vehicle. The output of the inverter is connected to the primary side of the AC bus system. The input of the at least one active rectifier is connected to the secondary side of the AC bus system. The at least one charging output is connected to the output of the at least one active rectifier.

The bidirectional DC wallbox includes an isolating element configured to reversibly connect and disconnect the DC wallbox to an AC voltage network. In one embodiment, the AC network is a low-voltage public network that provides three-phase alternating current. The AC voltage is generally 380 V or 400 V. The isolating element is designed with electromechanical contactors in one embodiment. In another embodiment, the isolating element is designed with semiconductor switches.

The bidirectional DC wallbox also includes a rectifier (AC/DC converter) with a power factor correction filter (PFC) which is configured to rectify a three-phase AC voltage. The AC/DC converter is of a bidirectional design; that is to say, it can also convert direct current into three-phase alternating current. In one embodiment, the AC/DC converter includes power semiconductors, such as IGBT and MOS FET. In one embodiment, the inputs of the AC/DC converter are connected to the isolating element via inductors. In a further embodiment, a capacitor is connected between the outputs of the AC/DC converter.

The bidirectional DC wallbox includes a bidirectional active direct-voltage converter (DC/DC converter) with electrical isolation. This converts the output voltage of the AC/DC converter into at least one DC voltage of a predetermined voltage level. The voltage level is adjustable so that different output voltages of the DC/DC converter can be selected, e.g. 400 V or 800 V. In one embodiment, the DC/DC converter has a plurality of outputs whose output voltage can be selected individually so that each output can provide a different output voltage. In one embodiment, the charging power of the DC wallbox can be divided as desired between the outputs of the DC/DC converter.

The bidirectional active direct-voltage converter (DC/DC converter) includes an inverter (DC/AC converter) and an alternating voltage bus system (AC bus) having a primary side and a secondary side electrically isolated therefrom. The DC/DC converter includes at least one active rectifier (AC/DC converter) configured to convert an AC voltage into a DC voltage of a predetermined voltage level and at least one charging output for connection to a charging socket of an electric vehicle. The output of the inverter is connected to the primary side of the AC bus system. The input of the at least one active rectifier is connected to the secondary side of the AC bus system. The at least one charging output is connected to the output of the at least one active rectifier.

The inverter is also of bidirectional design and converts the direct voltage present at its inputs into a single-phase AC voltage. In one embodiment, the DC/AC converter includes power semiconductors, such as IGBT and MOS FET.

The alternating-voltage bus system (AC bus) includes a primary side and a secondary side electrically isolated therefrom. In one embodiment, the AC bus includes a transformer. In this embodiment, the primary winding of the transformer forms the primary side of the AC bus. The secondary winding is part of the secondary side of the AC bus. The primary side of the alternating-voltage bus system is connected to the output of the inverter. In one embodiment, a plurality of terminals for active AC/DC converters are provided on the secondary side of the AC bus, e.g. additional secondary windings. The standardized interface on the secondary side allows a modular expansion of the DC wallbox and the creation of additional charging options. In this case, only expansion modules with active AC/DC converters may be connected to the additional secondary windings in order to expand the DC wallbox for the connection of a plurality of vehicles or consumers. This creates cost-effective additional charging options for the user which are electrically isolated from each other as well as from the network infrastructure.

The bidirectional active direct-voltage converter (DC/DC converter) includes at least one active rectifier (AC/DC converter) which is configured to convert an AC voltage into a DC voltage of a predetermined voltage level, or conversely to convert a DC voltage of a predetermined voltage level into a single-phase AC voltage. In one embodiment, the AC/DC converter includes power semiconductors such as IGBT and MOS FET.

The at least one active AC/DC converter has a charging output for connection to a charging socket of an electric vehicle, e.g. a charging cable with a charging plug which fits into the charging socket. In a further embodiment, the bidirectional active DC/DC converter includes a plurality of AC/DC converters, each having a charging output. In one embodiment, the bidirectional active direct-voltage converter includes two, three, four or five AC/DC converters. A plurality of vehicles or consumers can thus be connected to the DC wallbox at the same time. The active AC/DC converters each provide a flexible charging voltage.

In one embodiment, a base module of the bidirectional DC wallbox includes an isolating element, an AC/DC converter with PFC, and a DC/DC converter with electrical isolation. The DC/DC converter includes a DC/AC converter, an AC bus, and an AC/DC converter. In one embodiment, the base module is designed for a connected load of 22 kW. Only one base module is used for the DC wallbox, in one embodiment.

In a further embodiment, one or more further active AC/DC converters are connected as expansion modules to the AC bus of the base module. The expansion modules are powered directly by the AC voltage on the secondary side of the AC bus, and each provide a flexible charging voltage. In this case, the control unit for regulating voltage and current is contained in each expansion module. The distribution of the charging power between the vehicles is freely selectable. For example, in a DC wallbox with three charging connections, the total charging power of 22 kW can be distributed such that 11 kW of charging power is allocated to a first connected vehicle, 7 kW to a second connected vehicle, and 4 kW to a third connected vehicle.

With the DC wallbox, it is possible to charge the energy stores of a plurality of electric vehicles of different voltage classes simultaneously, for example a vehicle with 400 V and another vehicle with 800 V. Due to the electrical isolation of the individual AC/DC converters and the bidirectionality, it is also possible to charge the energy store of a connected electric vehicle directly from the energy store of a further connected electric vehicle, i.e. to realize direct charging from vehicle to vehicle.

It is thus possible for the operator of the DC wallbox to realize a second, third or fourth bidirectional charging option without purchasing and installing additional complete DC wallboxes.

In one embodiment, the DC wallbox includes a shutdown device. The shutdown device is designed to disconnect the DC wallbox from the AC voltage network and from the connected vehicles or consumers and to cut off their power.

In a further embodiment, the DC wallbox includes a communication unit. The communication unit is configured for communication between the DC wallbox and a mobile device of a user, e.g. a smartphone, PDA, laptop or tablet. Communication can take place, for example, via mobile radio or WLAN, or via NFC or Bluetooth. Via the communication unit, a user can transmit control commands to the DC wallbox and, for example, set the distribution of the total charging power to the individual charging outputs. A corresponding software application ("app") can be used on the mobile device.

One embodiment is a method for operating the DC wallbox. The method includes connecting at least one energy store to a charging output of the DC wallbox and connecting the DC wallbox to an AC voltage network by closing the isolating element. The method includes transmitting electrical energy from the AC voltage network into the at least one connected energy store or from the at least one connected energy store into the AC voltage network.

In one embodiment of the method, the AC voltage network is a low-voltage public network that provides three-phase AC power. The alternating voltage is generally 380 V or 400 V.

In one embodiment of the method, an output voltage at each charging output of the DC wallbox is individually adjustable. In a further embodiment of the method, the total connected load of the DC wallbox can be freely distributed over the individual charging outputs. In one embodiment, the connected load of the DC wallbox is 22 kW.

The DC wallbox offers a number of advantages. Due to the modular design, an expansion module can be used, rather than another complete DC wallbox, to expand with additional charging stations. This reduces the costs incurred. The distribution of the charging power between the connected vehicles is freely selectable. The electric isolation makes it possible to charge vehicles with different traction voltages at the same time. Due to the bidirectionality, all connected vehicles can feed current back into the grid. In addition, it is also possible to transfer electrical energy from the energy store of a connected vehicle directly into the energy store of another connected vehicle. The DC wallbox also offers the possibility of providing a household energy store. Additional advantages and embodiments result from the description and the accompanying drawings.

The features mentioned above and the features yet to be explained below can be used not only in the combination specified in each case but also in other combinations or alone, without departing from the scope of the present disclosure.

BRIEF DESCRIPTION OF THE SEVERAL VIEWS OF THE DRAWINGS

Embodiments of the present disclosure are described in more detail with reference to the drawings.

DETAILED DESCRIPTION

Figure 1:
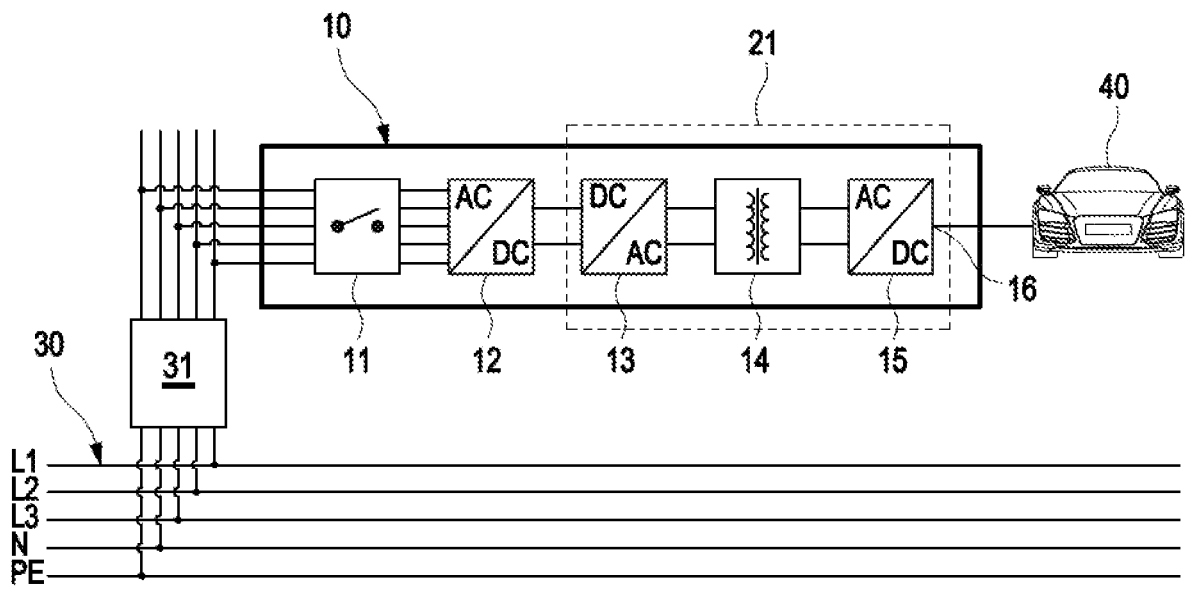
FIG. 1 illustrates a DC wallbox with a DC output, according to one embodiment.

FIG. 1 schematically shows an embodiment of a DC wallbox 10 with a DC output 16 and a connected electric vehicle 40. The DC wallbox 10 is connected to a low-voltage public network 30 via an isolating element 11. An energy meter 31, designed as a bidirectional meter, measures the energy flow between wallbox 10 and public network 30. A rectifier 12 with a power factor correction filter converts the network alternating current into direct current. The direct current is converted into single-phase alternating current in a downstream inverter 13. A transformer 14 provides electrical isolation. An active rectifier 15 is connected to the secondary side of the transformer 14 and generates a desired charging voltage for the energy store of the connected electric vehicle 30. The inverter 13, the transformer 14 and the active rectifier 15 together form a bidirectional DC/DC converter 21 with electrical isolation.

Figure 2:
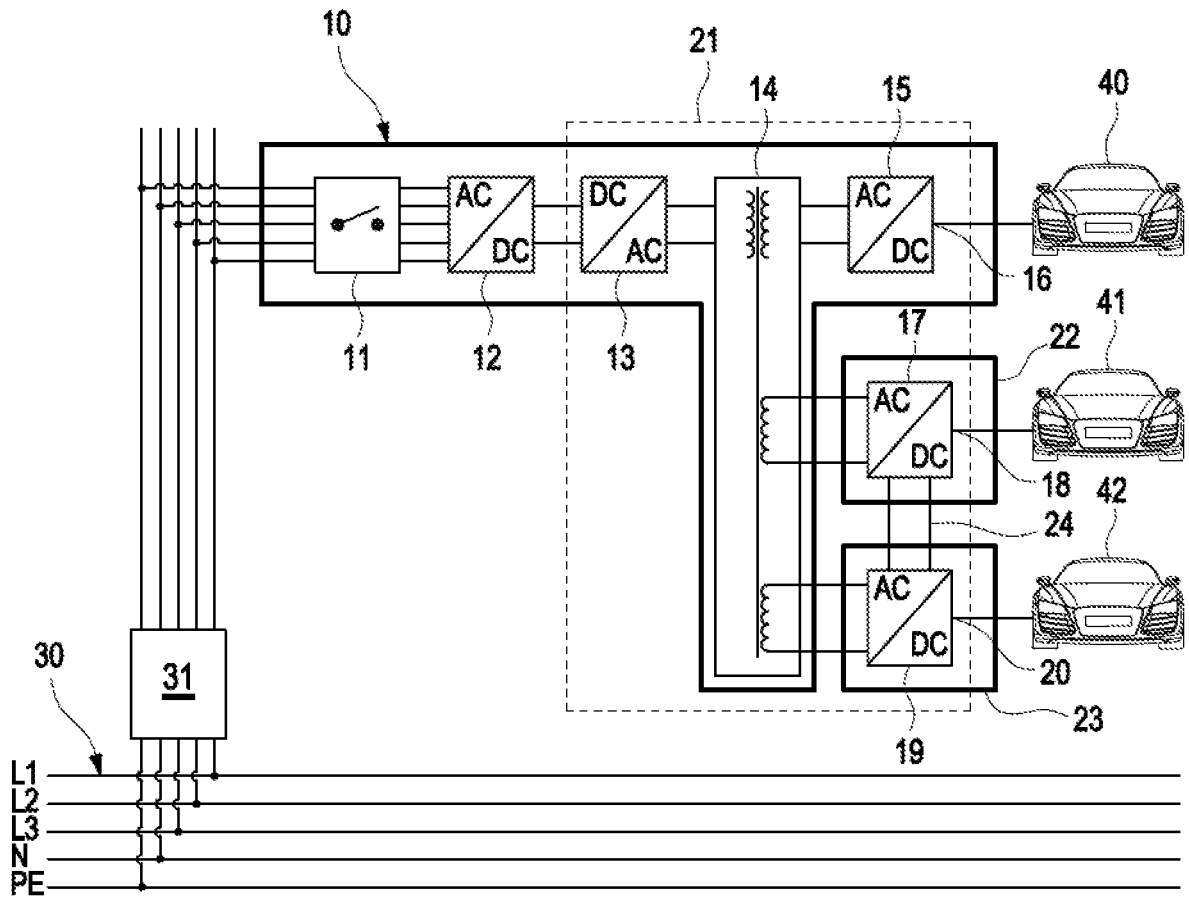
FIG. 2 illustrates a DC wallbox with three DC outputs, according to one embodiment.

FIG. 2 schematically shows an embodiment of the DC wallbox 10 with three DC outputs 16, 18, 20 and three connected electric vehicles 40, 41, 42. As in the embodiment shown in FIG. 1, a rectifier 12 with PFC converts the network alternating current into direct current. The direct current is converted into single-phase alternating current in a downstream inverter 13. A transformer 14 provides electrical isolation and is configured as an AC bus. In addition to the active rectifier 15 of the basic module, two expansion modules 22, 23 that each have an active rectifier 17, 19 are connected to the secondary side of the transformer. Each of the rectifiers 15, 17, 19 generates a desired charging voltage for the energy store of the electric vehicle 40, 41, 42 connected to it. The inverter 13, the AC bus 14 and the active rectifiers 15, 17, 19 together form a bidirectional DC/DC converter 21 with three outputs 16, 18, 20 which are able to provide different charging voltages. The outputs 16, 18, 20 are both electrically isolated from each other and from the input voltage.

This also makes it possible to carry out charging operations in which the energy store of a connected electric vehicle directly charges the energy store of another connected vehicle, i.e. vehicle-to-vehicle charging operations. In FIG. 2, a DC charging connection 24 is drawn between the expansion modules 22 and 23. This makes it possible, for example, to charge the energy store of the vehicle 41 directly with direct current from the energy store of the vehicle 42.

Figure 3:
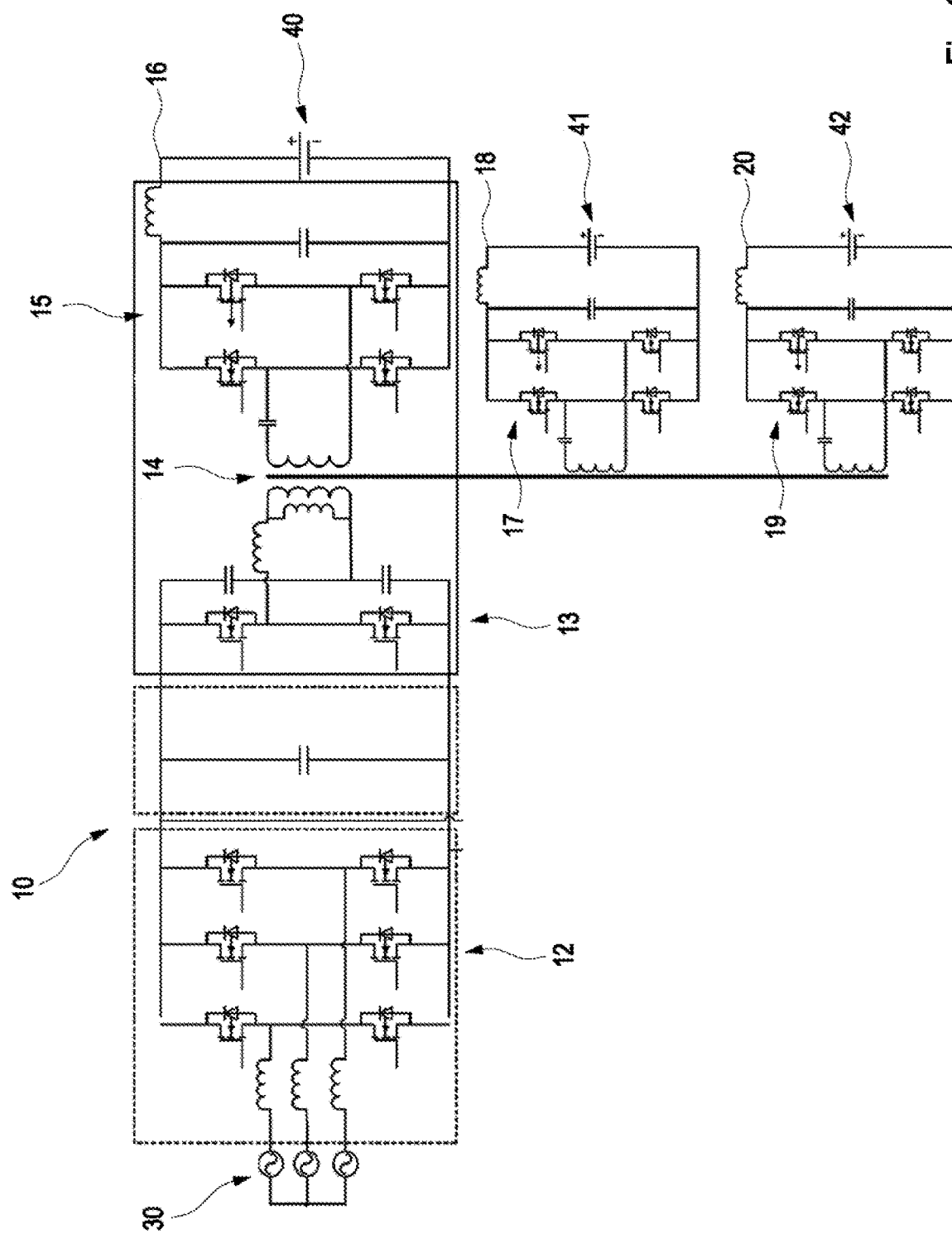
FIG. 3 is a circuit diagram of a DC wallbox with three DC outputs, according to one embodiment.

FIG. 3 shows a circuit diagram of a DC wallbox 10 with three DC voltage outputs 16, 18, 20. The alternating current provided by the public low-voltage network 30 is converted into direct current in the rectifier 12, converted into alternating current in the inverter 13, transferred with electrical isolation via the transformer 14 to the secondary side of the AC bus, and converted via the active direct-voltage converters 15, 17, 19 into charging voltages which are provided at the charging outputs 16, 18, 20 for charging the connected energy stores 40, 41, 42. The DC wallbox 10 can also be used to extract energy from the connected energy stores 40, 41, 42, to convert it into three-phase AC voltage, and to feed it into the low-voltage public network 30.

This application claims priority to German patent application no. 10 2019 211 553.5, filed Aug. 1, 2019, which is hereby incorporated herein by reference in its entirety.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bidirectional DC wallbox with an electrical isolation, the bidirectional DC wallbox comprising:
    an isolating element configured to reversibly connect and disconnect the bidirectional DC wallbox to an AC voltage network;
    a rectifier having a power factor correction (PFC) filter configured to rectify a three-phase AC voltage; and
    a DC/DC converter with an electrical isolation, the DC/DC converter including:
        an inverter;
        an AC bus system having a primary side and a secondary side electrically isolated therefrom;
        at least one active rectifier configured to convert an AC voltage into a DC voltage of a predetermined voltage level; and
        at least one charging output for connection to a charging socket of an electric vehicle;
    wherein an output of the inverter is connected to the primary side of the AC bus system, and an input of the at least one active rectifier is connected to the secondary side of the AC bus system, and the at least one charging output is connected to an output of the at least one active rectifier.

2. The bidirectional DC wallbox of claim 1, wherein the AC bus system includes a transformer.

3. The bidirectional DC wallbox of claim 1, wherein the DC/DC converter with electrical isolation includes a plurality of active rectifiers, each active rectifier having a charging output.

4. The bidirectional DC wallbox of claim 1, further comprising:
    a base module containing an isolating element; an AC/DC converter with a PFC filter; and
    a DC/DC converter with an electrical isolation which contains a DC/AC converter, an AC bus and an AC/DC converter.

5. The bidirectional DC wallbox of claim 4, wherein the base module is designed for a connected load of 22 kW.

6. The bidirectional DC-wall box of claim 4, wherein at least one expansion module is connected to a secondary side of the AC bus of the base module, said at least one expansion module including an active rectifier and a charging output for connection to a charging socket of an electric vehicle.

7. The bidirectional DC wallbox of claim 6, wherein each expansion module includes a control unit for regulating voltage and current.

8. A method, comprising:
   connecting at least one energy store to a charging output of a DC wallbox;
   connecting the DC wallbox to an AC voltage network by closing an isolating, element of the DC wallbox configured to reversibly connect and disconnect the directional DC wallbox to the AC voltage network; and
   transmitting electrical energy from the AC voltage network into the at least one energy store or from the at least one energy store into the AC voltage network.

9. The method of claim 8, wherein an output voltage at each charging output of the DC wallbox is individually adjustable.

10. The method of claim 8, wherein a total connected load of the DC wallbox can be freely distributed over a plurality of individual charging outputs of the DC wallbox.

\* \* \* \* \*